United States Patent Office 2,976,217
Patented Mar. 21, 1961

2,976,217
SUNSCREENING AGENTS

Saul I. Kreps, Cedar Grove, N.J., assignor to Van Dyk & Company, Inc., a corporation of New Jersey No Drawing. Filed Aug. 20, 1957, Ser. No. 679,121

9 Claims. (Cl. 167—90)

This invention relates to improved sunscreening agents.

As is known, the essential causative factor in producing sun burn on the human skin is the erythema-producing range of ultraviolet rays of sunlight or actinic light as from therapeutic lamps, mercury arc lamps etc. For protection against sun burn a number of different, specific protective compositions have been proposed which, when applied as a film of finely distributed particles, largely screen or absorb this erythema-producing range of energy equivalent to wavelengths of from about 2900 to 3200 Angstrom units. These preparations have been used in the form of emulsions and fine dispersions, as lotions, creams and the like for topical application.

Among the compositions proposed for this purpose are dispersions of p-aldimino benzoic ester compounds of the formula $$R—CH=N—C_6H_4COOR_1$$

wherein R—CH= denotes an aldo-monose radical and $R_1$ denotes a lower group. As explained in the U.S. patent to Schreiber 2,659,689, such compounds may be prepared by condensing a monohexose, such as glucose and mannose with an alkyl p-amino benzoate. Compounds of this type present certain disadvantages in use. The presence of the polyhydroxylated aldo-monose radical results in low solubility in non polar solvents, in alcohols and other solvents commonly employed in the formulation of skin protective preparations. Additionally, the relatively large aldo-monose radical does not contribute to the desired resonance structure of the molecule and thus dilutes or reduces the screening power of the composition on a unit weight basis. Further, the aldo-monose radical is sensitive to the heat necessary in the formulation of emulsified dispersions or lotions of the material because the customary elevated temperatures employed in such formulations induce dehydration and caramelization of the sugar moiety of the material. This results in darkening, discoloration and decomposition of such materials.

A major object of the invention is to produce a variety of effective screening compositions of the p-aldimino benzoate ester type which have an improved or enhanced solubility in non-polar solvents, alcohols and other solvents commonly employed in the formulation of the cosmetic products.

Another object is to produce novel screening compositions of the p-aldimino benzoate ester type which are characterized by excellent thermal stability and which do not discolor, darken or decompose at the elevated temperatures employed in formulating skin-protective preparations.

Yet another object is to produce new compositions of matter which are effective in protecting the human skin from erythema producing rays.

In the novel compositions contemplated by the inventor, as will be seen, the aldehyde-derived moiety of the p-aldimino benzoic ester is relatively small and has little effect in reducing the screening power of the compositions.

The novel compositions comprehended by the invention comprise p-aldimino benzoic ester compounds of the formula

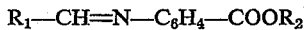

wherein $R_1$—CH= is derived from any alkyl, aryl or substituted alkyl or aryl aldehyde. Thus $R_1$ may be hydrogen, an alkyl or aryl radical or a heterocyclic radical while $R_2$ is generally, but not limited to, a lower molecular weight alkyl or substituted alkyl radical.

To more clearly bring out the efficacy of the novel compositions there is shown in the Figs. I and II of the accompanying drawings, spectrophotometric curves of two typical sunscreening compounds of the invention.

The invention can more readily be understood from a consideration of typical or characteristic examples of the novel screening agents.

Example I

The compound ethyl-p-methylene iminobenzoate is prepared by dissolving 165 grams of ethyl-p-aminobenzoate in an equal weight of methyl alcohol and to this is added 81 grams of 37% formalin solution and 1 gram of glacial acetic acid. The mixture is heated under reflux for 15 minutes during which time the condensation results in the formation of a heavy white paste. The solid product is filtered from the solvent and recrystallized from isopropyl alcohol. As shown in Fig. 1 of the drawing, the extinction coefficient curve shows excellent absorption of erythema-producing wave lengths of sunlight. In this composition $R_1$ is hydrogen and $R_2$ is $C_2H_5$. The reaction involved in the preparation of the compound is

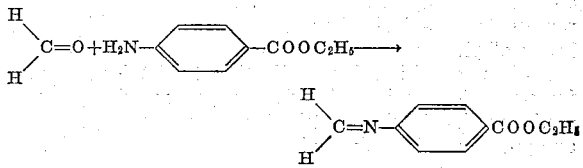

This general reaction can be employed to produce a series of screening compounds. In lieu of acetic acid, other strong organic or mineral acids or suitable acid salts may be employed for the condensation reaction.

Example II

Ethyl-p-N-butylidene iminobenzoate is prepared in a similar manner by dissolving 990.6 grams of ethyl p-aminobenzoate in 1400 grams of methanol. To this solution is added 432.6 grams of N-butyraldehyde and 6 grams of glacial acetic acid. The mixture is refluxed for 3.5 hours and the solvent is removed by distillation at a moderate vacuum. On cooling, the condensate crystallizes from the mixture. The products may be purified by recrystallization from methanol. In this compound $R_1$ is $CH_3—CH_2—CH_2$ and $R_2$ is $C_2H_5$. As shown in Fig. 2 the extinction coefficient curve of this compound establishes it as an efficient absorber of erythema-producing radiation.

These materials are thermostable and do not darken or discolor when heated to 100° C. It has been established that the methylene iminobenzoate ester (Example I) at about 2% concentration and the butyleneimino benzoate ester at about 1.5% concentration are equivalent in screening power to a glucosyliminobenzoate ester at about 2.7% concentration. This greater screening power per weight unit is attributable at least in part to the lower molecular weight of the R radicals in Examples I and II.

The compounds of the invention may be formulated with vegetable or mineral oil emulsion and water soluble organic solvents, within which the screening agent is dispersed or as a finely ground suspension in any cosmetically acceptable vehicle or carrier or in the form of alcohol lotions or sun tan creams, with or without titanium dioxide, in the manner known in the art.

Since the essential screening effect is inherent in the structure

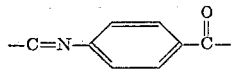

other things being equal, it is desirable to keep the molecular weight of the $R_1$ and $R_2$ groups low to decrease the weight of the screening compound required to provide the desired cosmetic protection.

It should also be observed that the earlier suggested gluconyliminobenzoate esters, by reason of the polyhydroxyl side chains, are relatively soluble in water, perspiration, sea water etc., and such compounds are more or less readily removed by such aqueous agents. The compounds of the invention, on the other hand, are highly insoluble in water, sea water and perspiration and such materials deposited on the skin are not readily removed by these agents.

It will be understood that while specific preferred examples of the improved screening agents have been described these are given to explain the underlying principles involved and not as limiting the useful scope of the invention to these particular embodiments.

I claim:

1. A composition for application to the human skin for protection against ultraviolet rays comprising a cosmetic carrier having distributed therethrough a small amount of a substance having the following formula:

$$R_1-CH=N-C_6H_4-COOR_2$$

wherein $R_1$ represents a radical taken from the class consisting of hydrogen, lower alkyl, and aryl; and $R_2$ represents a radical taken from the class consisting of lower alkyl.

2. A composition for application to the human skin for protection against ultraviolet rays comprising a cosmetic carrier having distributed therethrough a small amount of a substance having the following formula:

$$CH_2=N-C_6H_4-COOC_2H_5$$

3. A composition for application to the human skin for protection against ultraviolet rays comprising a cosmetic carrier having distributed therethrough a small amount of a substance having the following formula:

$$C_2H_4=N-C_6H_4-COOC_2H_5$$

4. A composition for application to the human skin for protection against ultraviolet rays comprising a cosmetic carrier having distributed therethrough a small amount of a substance having the following formula:

$$C_3H_6=N-C_6H_4-COOC_2H_5$$

5. A composition for application to the human skin for protection against ultraviolet rays comprising a cosmetic carrier having distributed therethrough a small amount of a substance having the following formula:

$$C_4H_8=N-C_6H_4-COOC_2H_5$$

6. A composition for application to the human skin for protection against ultraviolet rays comprising a cosmetic carrier, having distributed therethrough a small amount of a substance having the following formula:

$$Aryl \cdot CH=N-C_6H_4-COOR_2$$

wherein $R_2$ represents a radical taken from the class consisting of lower alkyl.

7. A composition for application to the human skin for protection against ultraviolet rays comprising a cosmetic carrier having distributed therethrough a small amount of a substance having the following formula:

$$C_2H_4=N-C_6H_4-COOR_2$$

wherein $R_2$ represents a radical taken from the class consisting of lower alkyl.

8. A composition for application to the human skin for protection against ultraviolet rays comprising a cosmetic carrier having distributed therethrough a small amount of a substance having the following formula:

$$C_3H_6=N-C_6H_4-COOR_2$$

wherein $R_2$ represents a radical taken from the class consisting of lower alkyl.

9. A composition for application to the human skin for protection against ultraviolet rays comprising a cosmetic carrier having distributed therethrough a small amount of a substance having the following formula:

$$C_4H_8=N-C_6H_4-COOR_2$$

wherein $R_2$ represents a radical taken from the class consisting of lower alkyl.

References Cited in the file of this patent

UNITED STATES PATENTS 2,659,689     Schreiber     Nov. 17, 1953

OTHER REFERENCES

Gilman: Organic Chemistry, John Wiley and Sons, N.Y., 2nd ed., 1943, vol. 1, page 659.

J. Society of Cosmetic Chemists, July 1956, pp. 360–361.

J.A.C.S., vol. 66, 1944, pp. 2124–5.